United States Patent
Ye et al.

(10) Patent No.: US 9,553,447 B2
(45) Date of Patent: Jan. 24, 2017

(54) ELECTRONIC DEVICE AND MOTHERBOARD AND PROTECTING CIRCUIT OF ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xin Ye, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 187 days.

(21) Appl. No.: 14/594,563

(22) Filed: Jan. 12, 2015

(65) Prior Publication Data

US 2016/0156181 A1    Jun. 2, 2016

(30) Foreign Application Priority Data

Nov. 28, 2014   (CN) .......................... 2014 1 0701803

(51) Int. Cl.
*H02H 11/00* (2006.01)
*G06F 1/26* (2006.01)
*G06F 1/16* (2006.01)

(52) U.S. Cl.
CPC .............. *H02H 11/005* (2013.01); *G06F 1/16* (2013.01); *G06F 1/26* (2013.01)

(58) Field of Classification Search
CPC ......... F03G 7/05; H02K 44/08; H02K 44/085; H02K 44/12; E21B 41/0007; H02H 11/005; G06F 1/16; G06F 1/26
See application file for complete search history.

(56) References Cited

U.S. PATENT DOCUMENTS 7,978,453 B2 *   7/2011   Sharaa ............... H03K 17/0822
                                                    361/91.1

* cited by examiner

*Primary Examiner* — Thienvu Tran
*Assistant Examiner* — Tien Mai
(74) *Attorney, Agent, or Firm* — Zhigang Ma

(57) ABSTRACT

An electronic device includes a chassis with a power button and a motherboard. The motherboard includes a slot, a controller chip, a startup circuit coupling to the power button, and a protecting circuit. The protecting circuit includes an electronic switch and an AND gate circuit. The electronic switch includes a first terminal coupled to the slot, a second terminal coupled to a ground, and a third terminal coupled to a first power supply through a first resistor. The AND gate circuit includes a first input end coupled to the first power supply, a second input end coupled to the controller chip, and an output end coupled to the startup circuit. The power button is pressed down, the controller chip outputs a control signal with a high voltage to the second input end of the AND gate circuit.

12 Claims, 3 Drawing Sheets

ELECTRONIC DEVICE AND MOTHERBOARD AND PROTECTING CIRCUIT OF ELECTRONIC DEVICE

FIELD

The subject matter herein generally relates to electronic devices, and particularly to a motherboard with a protecting circuit for the electronic device.

BACKGROUND

An electronic device, such as a server or a computer, generally includes a motherboard mounted in a chassis of the electronic device. A number of slots, such as dual inline memory modules and peripheral component interconnect express slots, can be mounted on the motherboard. Dust and conductive debris can enter the chassis of the electronic device during use. The conductive debris may enter the slots, short-circuiting adjacent pins of the slots and causing damage to the electronic device.

BRIEF DESCRIPTION OF THE DRAWINGS

Implementations of the present technology will now be described, by way of example only, with reference to the attached figures.

DETAILED DESCRIPTION

Figure 1:
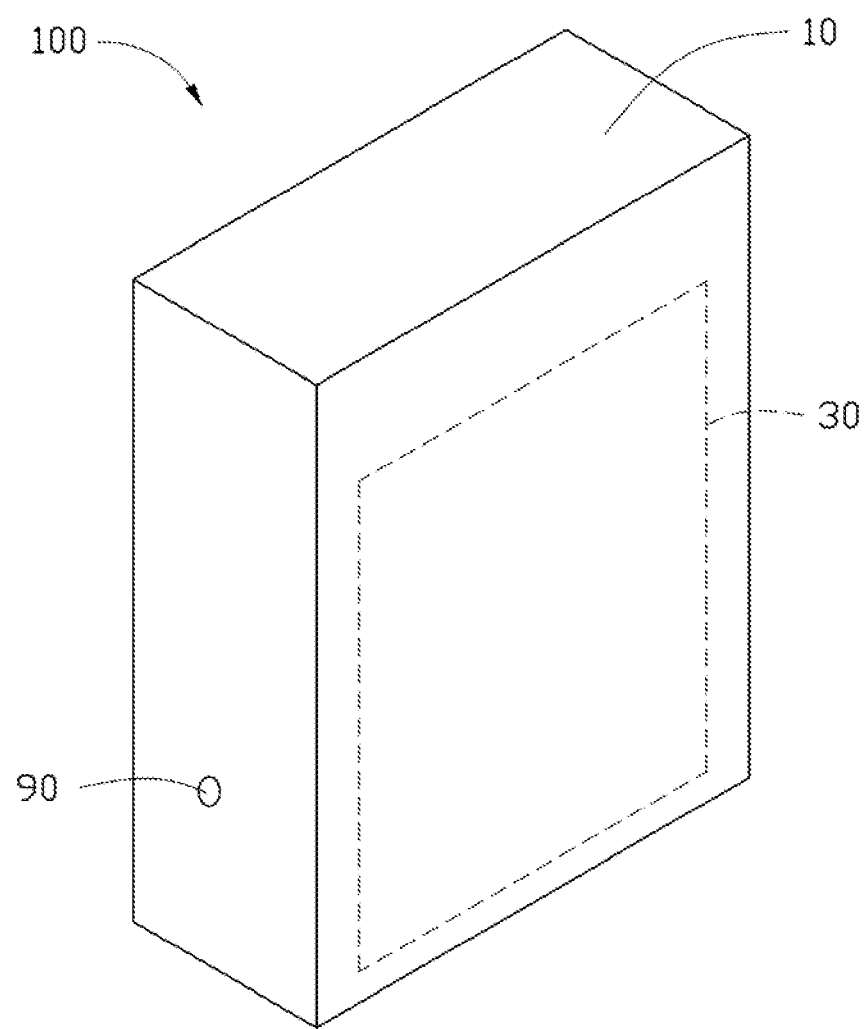
FIG. 1 is an isometric view of an embodiment of an electronic device, wherein the electronic device comprises a motherboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently coupled or releasably coupled. The term "comprising" means "including, but not necessarily limited to"; it specifically indicates open-ended inclusion or membership in a so-described combination, group, series and the like.

The present disclosure is described in relation to an electronic device.

Figure 2:
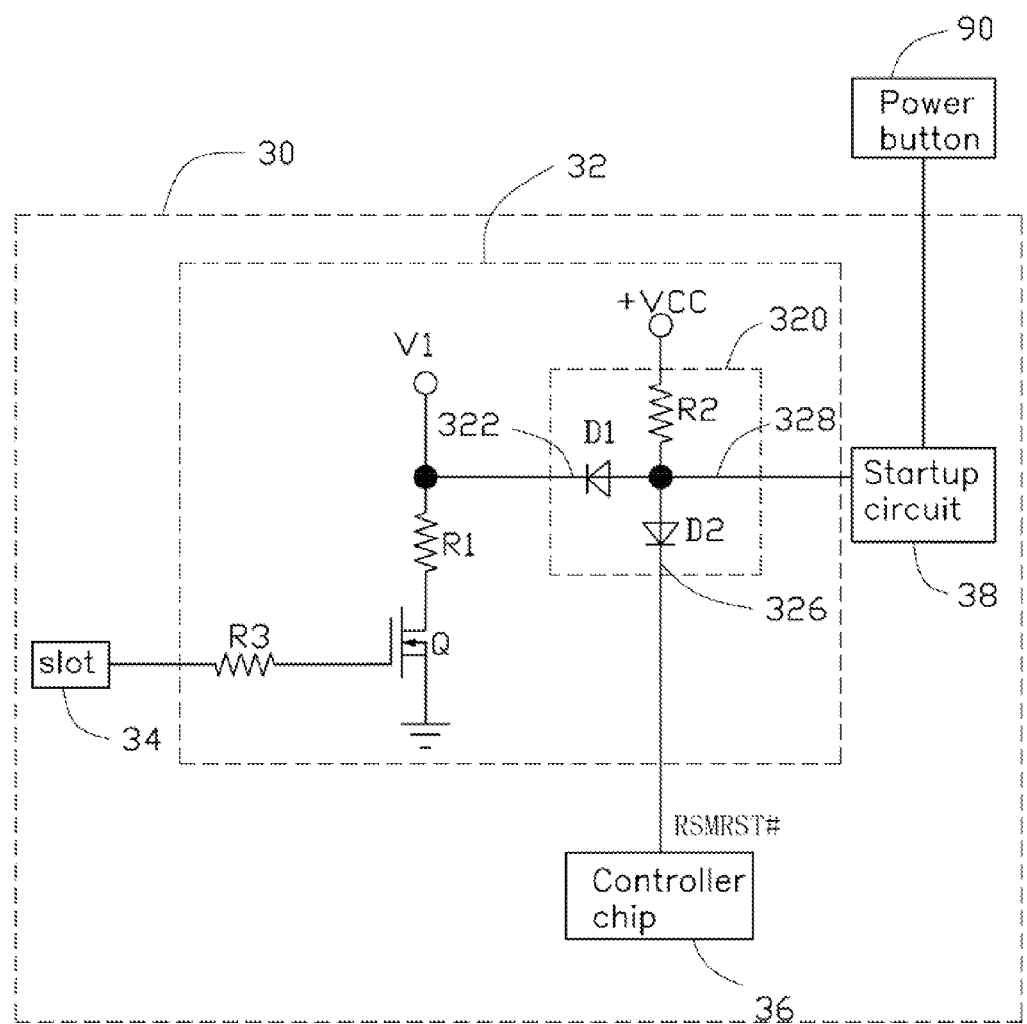
FIG. 2 is a circuit diagram of the motherboard of FIG. 1.

FIGS. 1 and 2 illustrate views of an electronic device 100. The electronic device 100 comprises a chassis 10 and a motherboard 30 installed in the chassis 10. The chassis 10 comprises a power button 90 electrically coupled with the motherboard 30. The motherboard 30 comprises a protecting circuit 32, a slot 34, a controller chip 36, and a startup circuit 38. The protecting circuit 32 comprises a field effect transistor Q, an AND gate circuit 320, and three resistors R1-R3. The AND gate circuit 320 comprises two diodes D1 and D2, A first input end 322, a second input end 326, and an output end 328.

The gate of the field effect transistor Q is coupled to the slot 34 through a resistor R3. The source of the field effect transistor Q is grounded. The drain of the field effect transistor Q is coupled to a first power supply V1 through the resistor R1. The anode of the diode D1 is coupled to a second power supply VCC through the resistor R2, and as the output end 328 of the AND gate circuit 320 coupled to the startup circuit 38. The cathode of the diode D1 as the first input end 322 of the AND gate circuit 320 is coupled to the first power supply V1. The anode of the diode D2 is coupled to the anode of the diode D1, and coupled to the second power supply VCC through a resistor R2. The cathode of the diode D2 as the second input end 326 of the AND gate circuit 320 is coupled to the controller chip 36 to receive a control signal RSMRST# from the controller chip 36.

Figure 3:
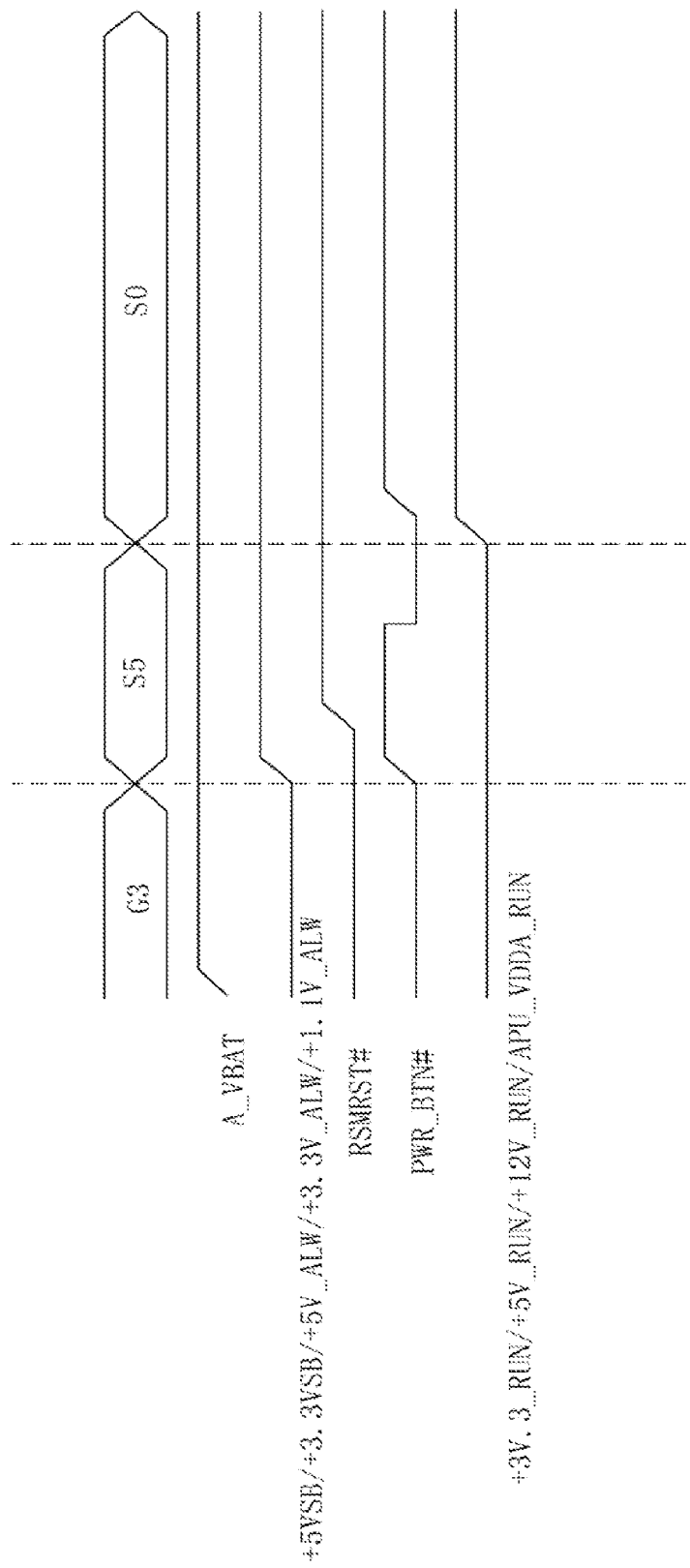
FIG. 3 is a waveform diagram of signals on the motherboard booting sequentially of FIG. 2.

FIG. 3 illustrate a waveform diagram of signals on the motherboard 30. When the motherboard 30 is in G3 status, only the battery A_VBAT supplies power to the motherboard 30. When the motherboard 30 is in S5 status, Auxiliary power supplies +5VSB/+3.3VSB/+5V_ALW/+3.3V_ALW/+1.1V_ALW supply power to the motherboard 30. When the power button 90 is pressed down, the PWR_BTN# outputs a high voltage to the motherboard 30, the controller chip 36 outputs the control signal RSMRST# with high voltage to the motherboard 30, and a series of power supplies +3V.3_RUN/+5V_RUN/+12V_RUN/APU_VDDR_RUN output power to maintain the electronic device 100 operation. The control signal RSMRST# is the bridge of the motherboard 30 changing from G3-S5-S0 states, so the control signal RSMRST# together with the status of the slot 34 is configured to control whether the electronic device 100 is started, for preventing damage to the electronic device 100 when a short-circuiting occurs between two adjacent pins of the slot 34.

In the embodiment, the control chip 36 is a super I/O chip. The super I/O chip determines the status of the motherboard 30 and outputs the control signal RSMRST#.

When the motherboard is in S5 status, the power button 90 is pressed down, the control chip 36 outputs the control signal RSMRST# with high voltage to the AND gate circuit 320 through the second input end 326. If a short-circuiting occurs between two adjacent pins of the slot 34, the slot 34 outputs high current to turn on the field effect transistor Q, the first input end 322 of the AND gate circuit 320 receives a low voltage, the low voltage from the first input end 322 and the high voltage from the second input end 326 passes through the AND gate circuit 320, the AND gate 320 outputs a low voltage to the startup circuit 38 through the output end 328. The startup circuit 38 cannot perform start-up operation, and the electronic device 100 cannot be booted. If no short-circuiting occurs between two adjacent pins of the slot 34, the field effect transistor Q is turned off, the first input end 322 of the AND gate circuit 320 receives a high voltage, the second input end 326 of the AND gate circuit 320 receives a high voltage from the controller chip 36, the AND gate circuit 320 outputs a high voltage to the startup circuit 38 through the output end 328. The startup circuit 38 can perform start-up operation, and the electronic device 100 is booted.

In the operations described, it can be seen that the field effect transistor Q behaves as an electronic switch in the circuit. In other embodiments, the field effect transistor Q can be substituted for other types of transistors or other electronic components with electronic switching functionality. For instance, if the field effect transistor Q is substituted for a NPN-type bipolar junction transistor, the base of the transistor is corresponded to the gate of the field effect transistor Q, the collector of the transistor is corresponded to the drain of the field effect transistor Q, and the emitter of the transistor is corresponded to the source of the field effect transistor Q.

Even though numerous characteristics and advantages of the embodiments have been set forth in the foregoing description, together with details of the structure and function of the embodiments, the present disclosure is illustrative only, and changes may be made in detail, including in the matters of shape, size, and arrangement of parts within the principles of the embodiments to the full extent indicated by the broad general meaning of the terms in which the appended claims are expressed.

What is claimed is:

1. A protecting circuit for a motherboard with a slot, a controller chip, and a startup circuit coupled to a power button, comprising:
    an electronic switch comprising a first terminal coupled to the slot, a second terminal coupled to a ground, and a third terminal coupled to a first power supply through a first resistor; and
    an AND gate circuit comprising a first input end coupled to the first power supply, a second input end coupled to the controller chip, and an output end coupled to the startup circuit;
    wherein when the power button is pressed down, the controller chip outputs a control signal with a high voltage to the second input end of the AND gate circuit, and wherein when there is a short-circuiting occurring between two adjacent pins of the slot, the electronic switch is turned on, the first input end of the AND gate circuit receives a low voltage, the output end of the AND gate circuit outputs a low voltage to the startup circuit, and the startup circuit cannot perform start-up action.

2. The protecting circuit of claim 1, wherein when there is no short-circuiting occurs between two adjacent pins of the slot, the electronic switch is turned off, the first input end of the AND gate circuit receives a high voltage, the output end of the AND gate circuit outputs a high voltage to the startup circuit, and the startup circuit performs start-up action.

3. The protecting circuit of claim 1, wherein the AND gate circuit comprises a first diode and a second diode, an anode of the second diode is coupled to a second power supply through a second resistor and as the output end of the AND gate circuit coupled to the startup circuit, a cathode of the first diode as a first input end of the AND gate circuit coupled to the first power supply, an anode of the second diode is coupled to the anode of the first diode, and a cathode of the second diode as the second input end of the AND gate circuit is coupled to the controller chip.

4. The protecting circuit of claim 1, wherein the controller chip is a super I/O chip.

5. A motherboard comprising:
    a slot;
    a controller chip;
    a startup circuit coupling to a power button; and
    a protecting circuit comprising:
        an electronic switch comprising a first terminal coupled to the slot, a second terminal coupled to a ground, and a third terminal coupled to a first power supply through a first resistor; and
        an AND gate circuit comprising a first input end coupled to the first power supply, a second input end coupled to the controller chip, and an output end coupled to the startup circuit;
    wherein when the power button is pressed down, the controller chip outputs a control signal with a high potential to the second input end of the AND gate circuit, when there is a short-circuiting occurring between two adjacent pins of the slot, the electronic switch is turned on, the first input end of the AND gate circuit receives a low voltage, the output end of the AND gate circuit outputs a low voltage to the startup circuit, and the startup circuit cannot perform start-up action.

6. The motherboard of claim 5, wherein when there is no short-circuiting occurs between two adjacent pins of the slot, the electronic switch is turned off, the first input end of the AND gate circuit receives a high voltage, the output end of the AND gate circuit outputs a high voltage to the startup circuit, and the startup circuit performs start-up action.

7. The motherboard of claim 5, wherein the AND gate circuit comprises a first diode and a second diode, an anode of the second diode is coupled to a second power supply through a second resistor and as the output end of the AND gate circuit coupled to the startup circuit, a cathode of the first diode as a first input end of the AND gate circuit coupled to the first power supply, an anode of the second diode is coupled to the anode of the first diode, and a cathode of the second diode as the second input end of the AND gate circuit is coupled to the controller chip.

8. The motherboard of claim 5, wherein the controller chip is a super I/O chip.

9. An electronic device comprising:
    a chassis comprising a power button; and
    a motherboard received in the chassis, comprising:
        a slot mounted on the motherboard;
        a controller chip;
        a startup circuit coupling to the power button; and
        a protecting circuit comprising:
            an electronic switch comprising a first terminal coupled to the slot, a second terminal coupled to a ground, and a third terminal coupled to a first power supply through a first resistor; and
            an AND gate circuit comprising a first input end coupled to the first power supply, a second input end coupled to the controller chip, and an output end coupled to the startup circuit;
        wherein when the power button is pressed down, the controller chip outputs a control signal with a high voltage to the second input end of the AND gate circuit, when there is a short-circuiting occurring between two adjacent pins of the slot, the electronic switch is turned on, the first input end of the AND gate circuit receives a low voltage, the output end of the AND gate circuit outputs a low voltage to the startup circuit, and the startup circuit cannot perform start-up action.

10. The electronic device of claim 9, wherein when there is no short-circuiting occurs between two adjacent pins of the slot, the electronic switch is turned off, the first input end of the AND gate circuit receives a high voltage, the output end of the AND gate circuit outputs a high voltage to the startup circuit, and the startup circuit performs start-up action.

11. The electronic device of claim 9, wherein the AND gate circuit comprises a first diode and a second diode, an anode of the second diode is coupled to a second power supply through a second resistor and as the output end of the AND gate circuit coupled to the startup circuit, a cathode of the first diode as a first input end of the AND gate circuit coupled to the first power supply, an anode of the second diode is coupled to the anode of the first diode, and a cathode of the second diode as the second input end of the AND gate circuit is coupled to the controller chip.

12. The electronic device of claim 9, wherein the controller chip is a super I/O chip.

* * * * *